(12) United States Patent
Takeuchi

(10) Patent No.: US 8,922,703 B2
(45) Date of Patent: Dec. 30, 2014

(54) FOCUS DETECTION APPARATUS

(75) Inventor: Kengo Takeuchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 367 days.

(21) Appl. No.: 13/526,827

(22) Filed: Jun. 19, 2012

(65) Prior Publication Data

US 2012/0327291 A1 Dec. 27, 2012

(30) Foreign Application Priority Data

Jun. 22, 2011 (JP) ................. 2011-138705
Apr. 11, 2012 (JP) ................. 2012-090367

(51) Int. Cl.
*G03B 13/00* (2006.01)
*H04N 5/232* (2006.01)

(52) U.S. Cl.
CPC ................. *H04N 5/23212* (2013.01)
USPC ............... 348/348; 348/345; 348/352

(58) Field of Classification Search
USPC ...................... 348/345, 348, 352
See application file for complete search history.

(56) References Cited

U.S. PATENT DOCUMENTS

2009/0284645 A1* 11/2009 Nozaki et al. ............... 348/349
2010/0002128 A1* 1/2010 Ishii ............................ 348/349

FOREIGN PATENT DOCUMENTS

JP 8-15603 A 1/1996
JP 2002-258147 A 9/2002

* cited by examiner

*Primary Examiner* — Anthony J Daniels
(74) *Attorney, Agent, or Firm* — Canon USA Inc IP Division

(57) ABSTRACT

A pixel selection unit sets an area based on a detection result of a contrast detection unit, in a case where it is determined that reliability of a focusing state detected by a phase difference detection unit is low.

11 Claims, 19 Drawing Sheets

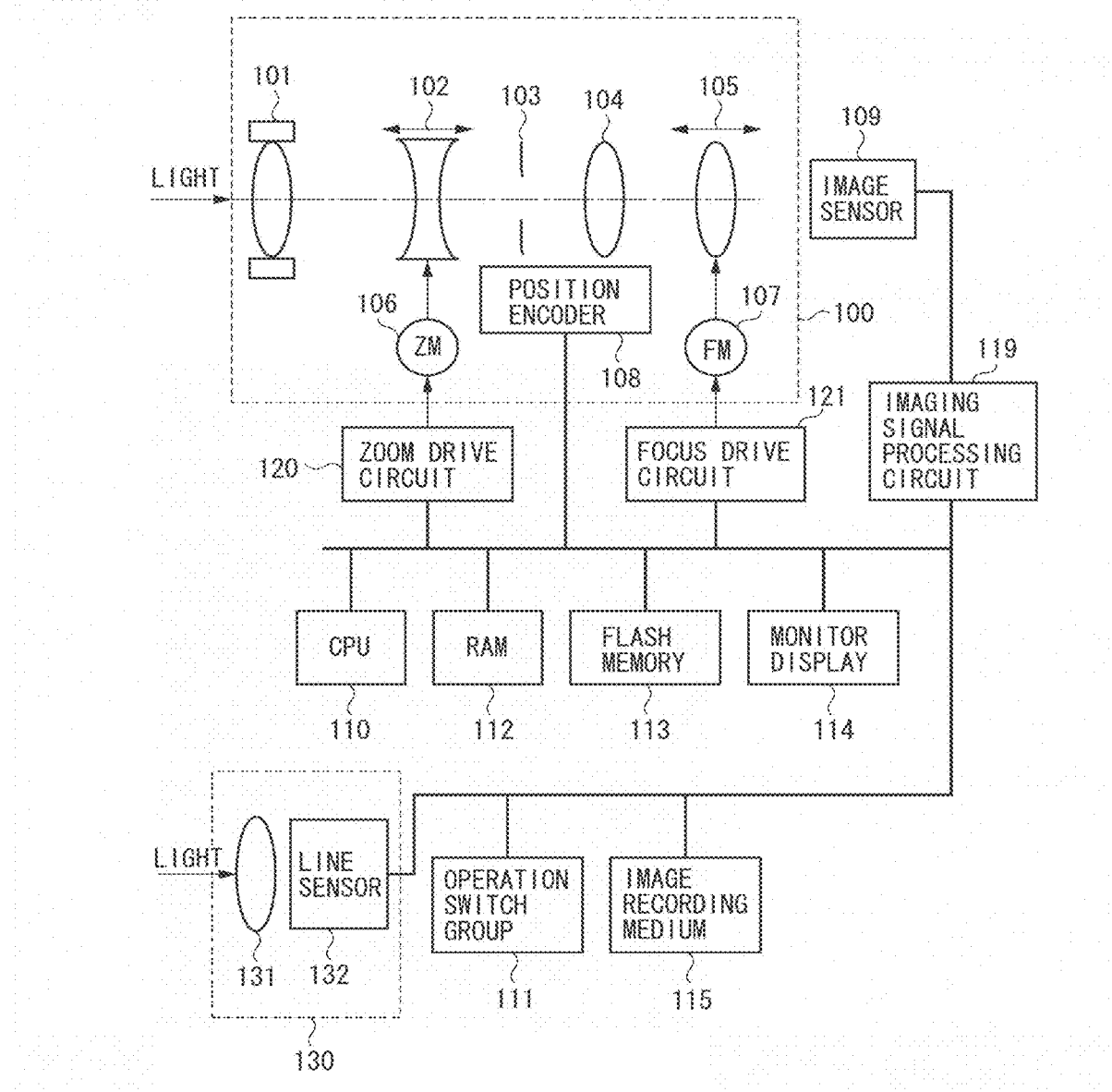

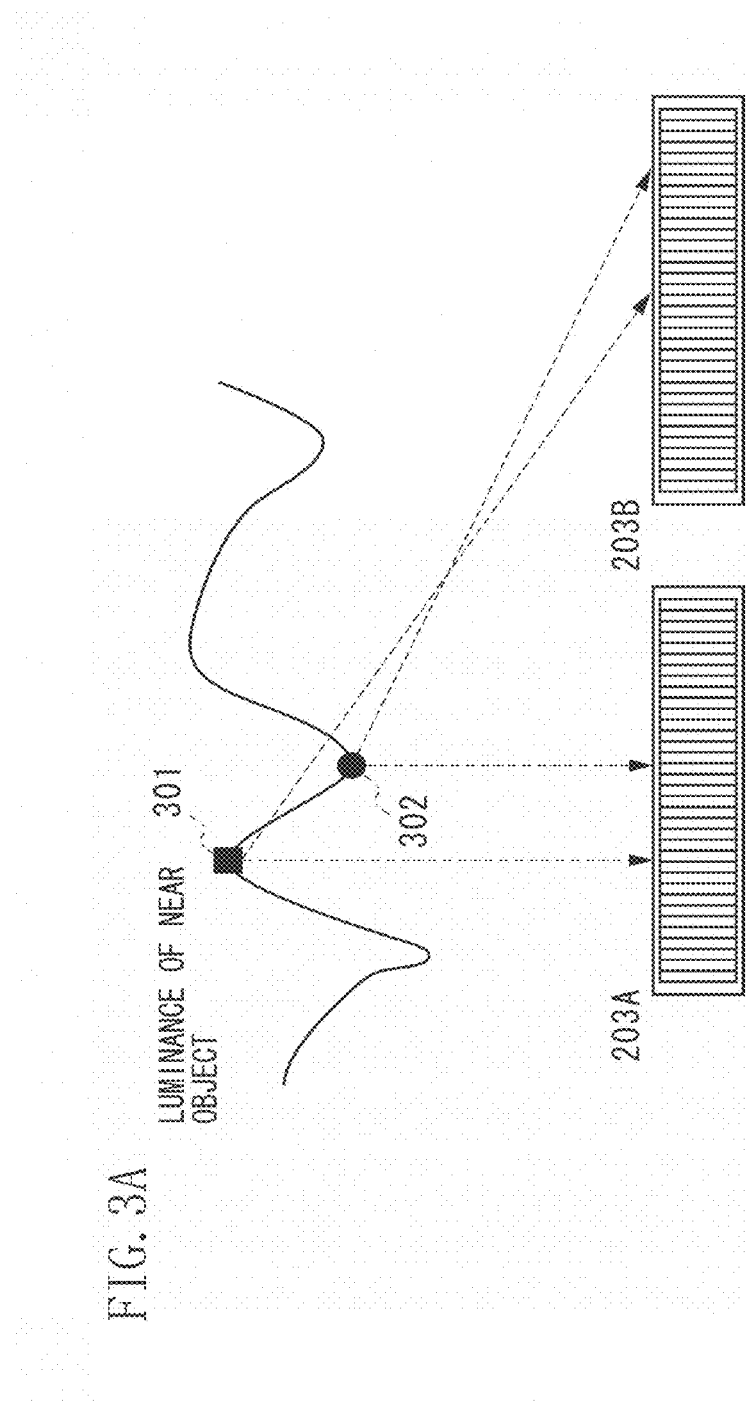

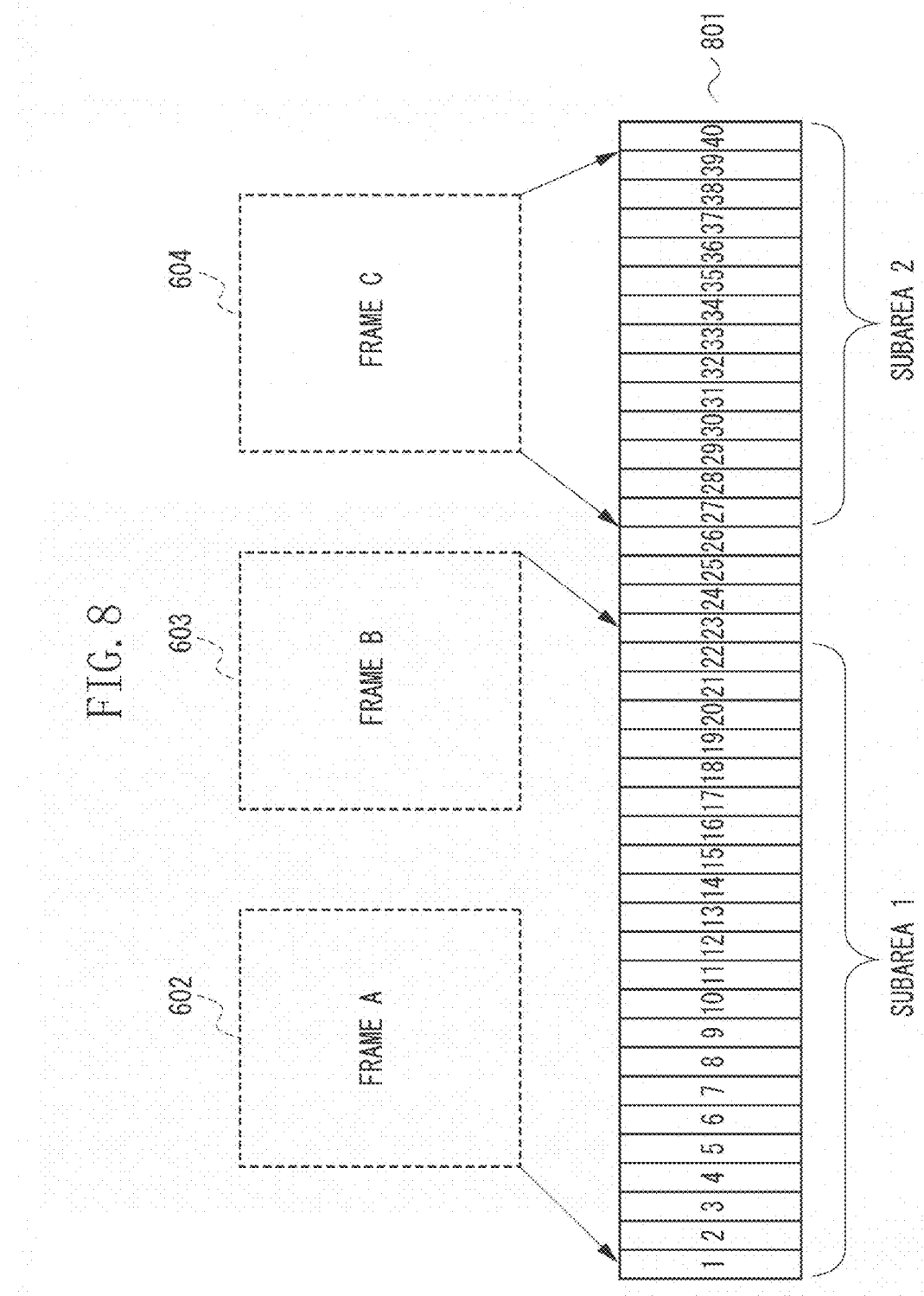

FIG. 16

| | TIME t0 | TIME t1 | TIME t2 | TIME t3 | TIME t4 |
|---|---|---|---|---|---|
| POSITION OF LENS | X0 | X1 | X2 | X2 | X3 |
| PHASE DIFFERENCE FRAME | BASIC FRAME | BASIC FRAME | BASIC FRAME | SUBAREA 1 SUBAREA 2 | SUBAREA 1 SUBAREA 2 |
| PHASE-DIFFERENCE DISTANCE MEASUREMENT VALUE | CORRESPONDING TO X2 | CORRESPONDING TO X2 | CORRESPONDING TO X2 | SUBAREA 1:X3 SUBAREA 2:X1 | SUBAREA 1:X3 SUBAREA 2:X1 |
| CONTRAST EVALUATION FRAME | FRAME A | FRAME A + | FRAME A + | FRAME A1 | FRAME A1:+ |
| | FRAME B | FRAME B + | FRAME B + | FRAME B1 | FRAME B1:+ |
| | FRAME C | FRAME C + | FRAME C - | FRAME C1 | FRAME C1:+ |
| | | | | FRAME A2 | FRAME A2:- |
| | | | | FRAME B2 | FRAME B2:- |

FIG. 18

|  | TIME t5 | TIME t6 |
|---|---|---|
| POSITION OF LENS | X3 | X3 |
| PHASE DIFFERENCE FRAME | SUBAREA 1 SUBAREA 2 | BASIC FRAME |
| PHASE-DIFFERENCE DISTANCE MEASUREMENT VALUE | SUBAREA 1:X3 SUBAREA 2:X1 | BASIC FRAME:X3 |
| CONTRAST EVALUATION FRAME | FRAME A1:+ | FRAME A |
| | FRAME B1:+ | |
| | FRAME C1:+ | FRAME B |
| | FRAME A2:− | |
| | FRAME B2:− | FRAME C |

FOCUS DETECTION APPARATUS

BACKGROUND OF THE INVENTION

1. Field of the Invention

The present invention relates to a focus detection apparatus for performing automatic focus adjustment control effectively used with an imaging apparatus such as a video camera.

2. Description of the Related Art

Generally, the contrast automatic focus (AF) system is employed as an AF system provided to an imaging apparatus such as a video camera. According to the contrast AF system, a high-frequency component is extracted from a video signal acquired by using an image sensor, and a so-called AF evaluation value signal is generated as a signal indicating a focusing state. Then, the position of a focus lens is controlled so as to maximize the AF evaluation value signal.

Further, there has been discussed an imaging apparatus employing the so-called hybrid AF system which is a combination of the contrast AF system and the so-called Non-TTL (Through the Lens) phase difference detection (Non-TTL AF) system in Japanese Patent Application Laid-Open No. 2002-258147.

According to the Non-TTL AF system, a distance to an object is directly detected by an AF sensor with use of light that does not pass through an imaging optical system, and the position of the focus lens is controlled based on the detected distance. Employing the hybrid AF system, which is a combination of the Non-TTL AF system and the above-described contract AF system, can realize an imaging apparatus having both a highly accurate and highly resolving focusing performance derived from the contrast AF system, and a high-speed focusing performance derived from the Non-TTL AF system.

According to the Non-TTL AF system, a correlation between two images is calculated based on signals of the object images acquired from a pair of line sensors, and a phase shift amount is calculated therebetween. Then, the distance to the object is measured based on the triangulation principle, and the position of the focus lens is controlled based on the detected distance.

If distances to objects are constant, the phase shift amounts of the objects detected by the line sensors are also uniquely determined. However, when there is a conflict among a plurality of distances (also referred to as "perspective conflict"), such as simultaneous entries of an object positioned 1 m from the imaging apparatus and an object positioned 10 m from the imaging apparatus into the angle of view of the sensors, it is difficult to uniquely determine the phase shift amounts of the objects.

To solve this problem, for example, Japanese Patent Application Laid-Open No. 8-15603 discusses a method of, in a case where it is determined that there is a conflict among a plurality of distances, dividing an image into a plurality of blocks, recalculating a correlation in each of the blocks, and respectively calculating the plurality of distances.

However, according to this method, an image is divided into small blocks in a manner predetermined to some degree, and therefore even recalculating a correlation in the small block may still result in occurrence of a conflicting state among a plurality of distances, thereby failing to perform focus detection with high precision. In this case, a correlation should be calculated once more with use of adjacent small blocks. In this way, this method lacks real-time responsiveness, which is a necessary feature for a built-in device, and fails to satisfy sufficient accuracy.

SUMMARY OF THE INVENTION

The present invention is directed to a focus detection apparatus capable of, when focus detection according to the phase difference AF system results in occurrence of a conflict among a plurality of distances, separating the plurality of distances to realize focus detection for each of the plurality of distances.

According to an aspect of the present invention, a focus detection apparatus includes an image sensor configured to photoelectrically convert an image of an object in an imaging range, which is formed by light transmitted through an imaging optical system, a phase difference detection unit configured to detect a focusing state from a phase difference between two images of the object, a pixel selection unit configured to set a range in which the phase difference is detected by the phase difference detection unit, and a contrast detection unit configured to detect contrast in a set object frame based on a signal from the image sensor. The pixel selection unit sets the range based on a detection result of the contrast detection unit, in a case where it is determined that reliability of the focusing state detected by the phase difference detection unit is low.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of a video camera provided with a focus detection apparatus according to a first exemplary embodiment of the present invention.

FIGS. 3A and 3B illustrate image signals in phase difference AF.

FIG. 8 illustrates subarea selection according to the first exemplary embodiment.

FIG. 16 illustrates the third exemplary embodiment.
FIG. 18 illustrates the third exemplary embodiment.

DESCRIPTION OF THE EMBODIMENTS

Figure 2A:
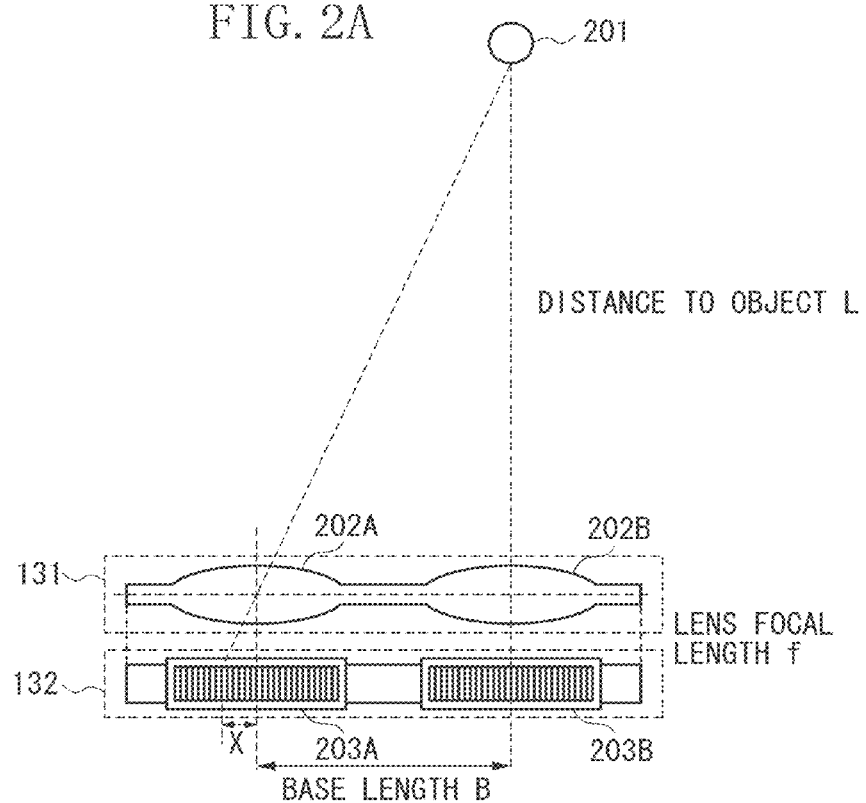
FIGS. 2A and 2B illustrate details of a Non-TTL AF sensor unit according to the first exemplary embodiment.

Various exemplary embodiments, features, and aspects of the invention will be described in detail below with reference to the drawings.

FIG. 1 illustrates a configuration of a video camera provided with a focus detection apparatus according to a first exemplary embodiment of the present invention. Referring to FIG. 1, a lens unit 100 is indicated by a dotted line. The lens unit 100 contains an imaging optical system including a stationary lens 101, a variable power lens 102, a diaphragm 103, a stationary lens 104, and a focus lens 105, which are disposed in this order from the object side (light incoming side).

A position encoder 108 detects the positions of the variable power lens 102, the diaphragm 103 (the diaphragm blades), and the focus lens 105. The variable power lens 102 is driven in an optical axis direction by a zoom motor 106, and the focus lens 105 is driven in the optical axis direction by a focus motor 107. These zoom motor 106 and focus motor 107 operate in response to drive signals from a zoom drive circuit 120 and a focus drive circuit 121, respectively.

An image sensor 109 is constituted by, for example, a complementary metal-oxide semiconductor (CMOS) sensor. The image sensor 109 photoelectrically converts an image of an object within an imaging area, which is formed by light incident on the imaging optical system.

An imaging signal processing circuit 119 applies various kinds of signal processing such as amplification processing, gamma correction processing, and white balance processing to a signal output from the image sensor 109, to convert the output signal to a video signal in a predetermined video format. The video signal is output to a monitor display 114, and/or is recorded into an image recording media 115 such as a semiconductor memory, an optical disk, and a hard disk.

A central processing unit (CPU) 110 is in charge of various kinds of control. The CPU 110 controls various kinds of operations and functions of the video camera via software. An operation switch group 111 includes, for example, a power switch, a switch for starting and stopping a recording operation and a reproduction operation, a switch for selecting an operation mode of the video camera, and a zoom switch for changing the zoom state of the imaging optical system.

Among these switches, operating the power switch causes a part of a computer program stored in a flash memory 113 to be loaded onto a random access memory (RAM) 112. Then, the CPU 110 performs processing according to the program loaded onto the RAM 112 to control the operations of the respective units. The video camera according to the present exemplary embodiment has a commonly-used contrast AF described before as an exemplary conventional technique.

An imaging signal corresponding to only a part of a screen is extracted by the imaging signal processing circuit 119 based on a video signal output from the image sensor 109. A contrast AF evaluation value is generated through a band pass filter, and then an in-focus degree is generated through another additional predetermined calculation. Focus control generally called hill-climbing control is performed based on this in-focus degree to search for an in-focus position.

A Non-TTL AF sensor unit 130 includes a Non-TTL imaging lens 131 and a line sensor 132. The line sensor 132 is constituted by a plurality of light receiving elements arranged in a line, the details of which will be described with reference to FIGS. 2A and 2B below.

The line sensor 132 receives light transmitted from an object via the Non-TTL imaging lens 131, which is disposed separately from the imaging optical system and has a focal length f. In other words, the line sensor 132 receives light that is transmitted from an object without passing through the imaging optical system. The transmitted object image is photoelectrically converted by the line sensor 132, and is digitized by an analog/digital (A/D) convertor (not illustrated).

The CPU 110 performs various kinds of digital processing with use of this image signal to calculate, for example, the distance to the object, the correlation amount, and the reliability. The Non-TTL AF is realized by driving the focus lens 105 via the focus motor 107 based on these calculation results. The Non-TTL AF sensor unit 130 and the CPU 110 correspond to a first focus detection unit in the present invention, which is configured to detect a focusing state from phase difference detection of two images of an object.

Figure 2B:
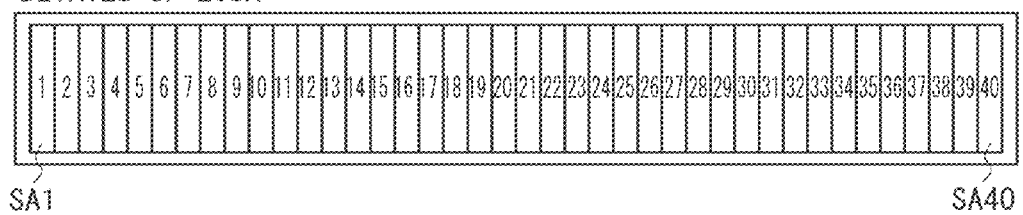

Next, the details of the Non-TTL AF sensor unit 130 will be described with reference to FIGS. 2A and 2B. Referring to FIG. 2A, an object 201 is a focus detection target (an imaging target). Lenses 202A and 202B are Non-TTL imaging lenses having a focal length f. Detection units 203A and 203B detect image signals of two images formed by lights transmitted through the Non-TTL imaging lenses 202A and 202B, respectively, thereby acquiring lights of the object 201 as an image A and an image B.

These Non-TTL imaging lenses 202A and 202B, and the detection units 203A and 203B are disposed so as to be spaced apart from each other by a base length B, respectively. Two image signals acquired by the detection units 203A and 203B are used to measure an object distance L based on the triangulation principle.

The Non-TTL imaging lenses 202A and 202B, and the detection units 203A and 203B correspond to the imaging lens 131 and the line sensor 132 illustrated in FIG. 1, respectively. Further, FIG. 2B illustrates more details of the detection unit 203A. As understood from FIG. 2B, the detection unit 203A is constituted by an image array in which 40 rectangular pixels each having a pixel pitch p are lined adjacent to each other. Therefore, the detection unit 203A is called a line sensor. The detection unit 203B has a similar configuration.

Further, the detection units 203A and 203B are under accumulation control by a digital circuit (not illustrated), and exceedance of a light amount at one pixel over a predetermined amount results in a stop of accumulation at other pixels as well. Further, the detection units 203A and 203B are configured to allow any pixels and any number thereof to be selected as accumulation control target pixels according to the setting by the CPU 110 at the time of focus detection.

In the following description, the target pixel in the image A of the detection unit 203A and the target pixel in the image B of the detection unit 203B are respectively referred in such a manner that "SA1" indicates the first pixel in the image A, and "SA40" indicates the fortieth pixel in the image A. Similarly, "SB4" indicates the fourth pixel in the image B.

Next, an example of object luminance of images acquired by the Non-TTL AF sensor unit 130 will be described with reference to FIGS. 3A and 3B. In particular, FIG. 3A illustrates the object luminance, and FIG. 3B illustrates image signals of acquired two images. In this example, the object is near to the video camera, i.e., the object is positioned approximately 50 cm from the video camera. The point represented by a square 301 is detected at the position of SA13 in the image A and the position of SB23 in the image B.

Similarly, the point represented by a circle 302 in the object is detected at the position of SA22 in the image A and the position of SB32 in the image B. This means that the image A and the image B are shifted from each other by a distance corresponding to 11 pixels, which indicates a phase difference therebetween. The distance to the object is calculated based on this shift amount according to the triangulation principle.

In this way, for an object positioned near the video camera, a large shift is generated between the images A and B. However, for an object positioned away from the video camera, especially, an infinitely distant object, such a shift is not generated, and the images A and B are almost identically detected.

Figure 4:
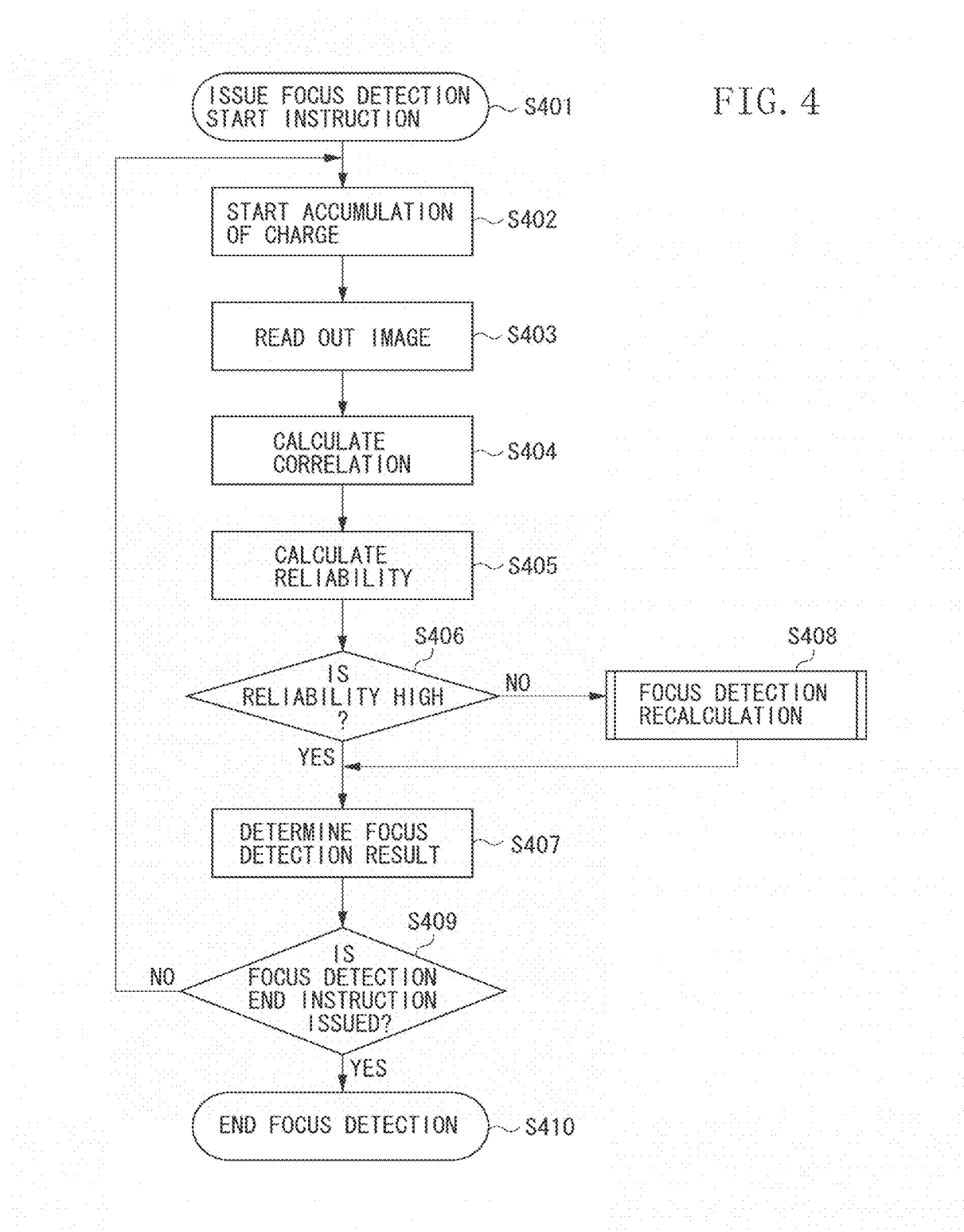
FIG. 4 is a flowchart illustrating a focus detection operation according to the first exemplary embodiment.

Next, a processing flow of the focus detection by the focus detection apparatus according to the present exemplary embodiment will be described with reference to FIG. 4. Referring to FIG. 4, in step S401, a focus detection start instruction is issued. Then, in step S402, the Non-TTL AF sensor starts accumulation of electric charge.

After a predetermined amount or more is accumulated within a certain area, the accumulation is ended. Then, in step S403, the accumulated amount of charge at each pixel is converted from analog data into digital data. Then, converted data is read out as an image signal of object luminance. In this example, the respective pixels of SA1 to SA40 and SB1 to SB40 are read out, and are set as the image A and the image B, respectively.

In step S404, the CPU 110 calculates a correlation between the read-out image A and image B, and calculates how much shift is needed to match the images. In step S405, the CPU 110 calculates accuracy of the calculated shift amount, i.e., the reliability of the detected focusing state.

In step S406, the CPU 110 determines whether the focus detection result is correct based on the reliability calculated in step S405, and determines whether the detected result can be used as a final focus detection result. The CPU 110, which performs step S406, corresponds to a reliability determination unit in the present invention.

In step S406, if the CPU 110 determines that the detected result is highly reliable and can be used as a final focus detection result (YES in step S406), the processing proceeds to step S407. In step S407, the CPU 110 determines the detected result as the focus detection result. Then, the processing proceeds to step S409. In step S409, it is determined that the above-described sequence is repeated until a focus detection end instruction is issued.

On the other hand, in step S406, if the CPU 110 determines that the detected result is not highly reliable (NO in step S406), the processing proceeds to step S408. In step S408, the CPU 110 performs focus detection recalculation processing which will be defined as another processing below.

The focus detection recalculation processing will be described below with reference to the flowchart of FIG. 5. In step S501, the focus detection recalculation is started. In step S502, the CPU 110 sets contrast AF frames from information indicating the field of the Non-TTL AF sensor.

Figure 6A:
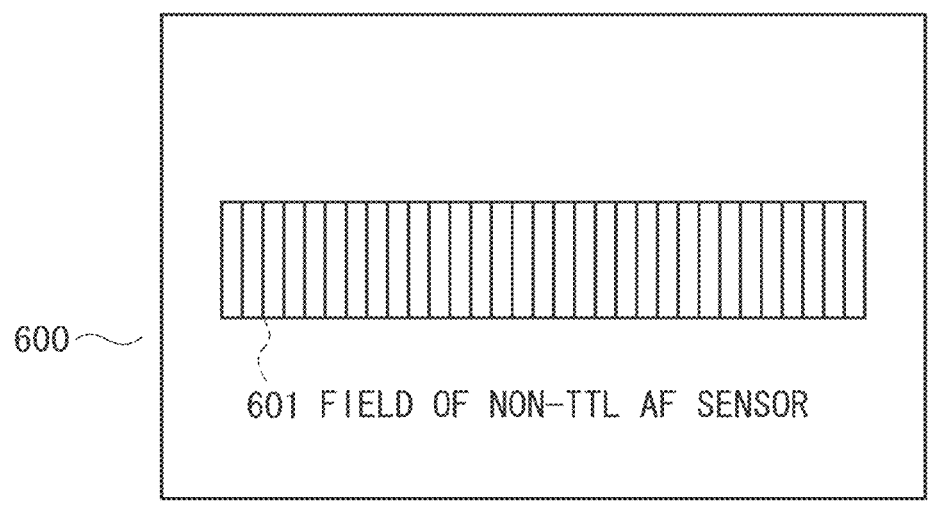
FIGS. 6A and 6B illustrate a field of the Non-TTL AF sensor and contrast AF frames according to the first exemplary embodiment.
Figure 6B:
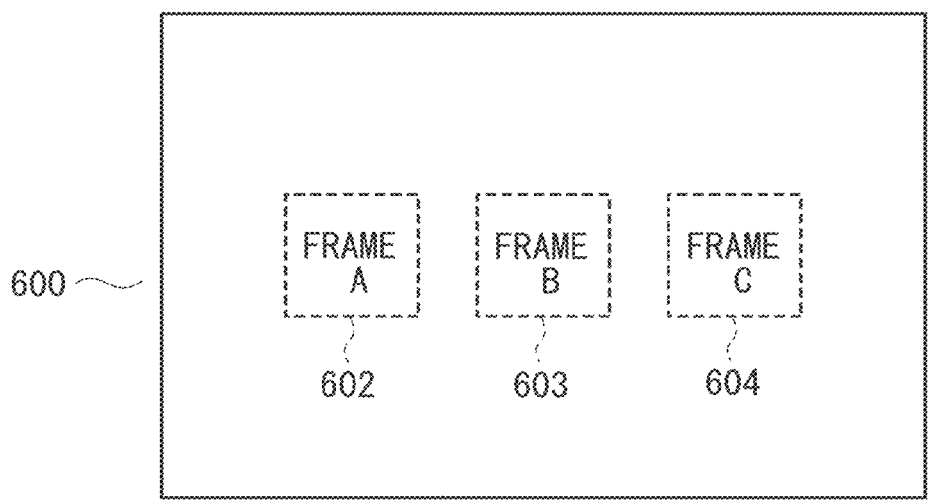

FIGS. 6A and 6B illustrate further details of the field of the Non-TTL AF sensor and the contrast AF frames. In particular, FIG. 6A illustrates an object frame 600 on an imaging plane of the image sensor 109, which corresponds to an angle of view of a video image recorded by the present video camera, and a field 601, which is an example of the field of the Non-TTL AF sensor relative to the angle of view.

The field 601 of the Non-TTL AF sensor is determined when the video camera is assembled, and the size thereof (object frame) relative to the angle of view of a video image to be recorded is changed so as to widen or narrow according to the focal length of the present imaging system. In FIG. 6B, the contrast AF frames are expressed in relation to the field 601 of the Non-TTL AF sensor.

When the CPU 110 determines the contrast AF frames in step S502, the CPU 110 calculates and specifies the field of the Non-TTL AF sensor from the focal length information of the main lens of the imaging optical system. Then, the CPU 110 sets three divided frames as the contrast AF frames in an overlapping area of a common portion shared by the field of the Non-TTL AF sensor and the angle of view. They are a frame A 602, a frame B 603, and a frame C 604 as the contrast AF frames.

Figure 5:
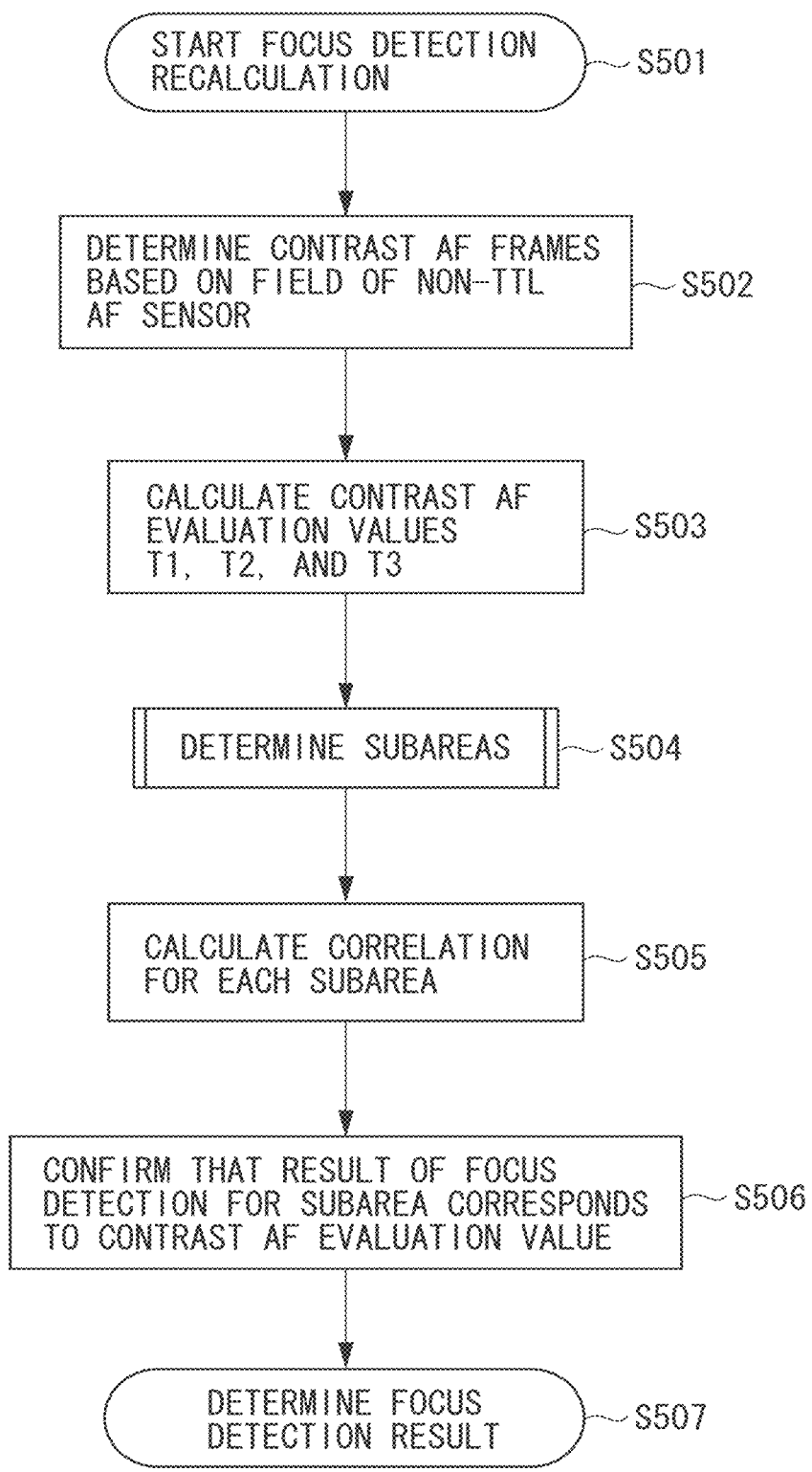
FIG. 5 is a flowchart illustrating a refocus detection operation according to the first exemplary embodiment.

In step S503 illustrated in FIG. 5, the CPU 110 calculates contrast AF evaluation values (T1, T2, and T3, respectively) from these contrast AF frames. The CPU 110, which performs steps 502 and 503, corresponds to a third focus detection unit in the present invention.

In step S504, the CPU 110 sets subareas (selects pixel areas) for Non-TTL AF based on the contrast AF evaluation values. The term "subarea" herein means an area divided at the time of focus detection as an area constituted by a plurality of pixels, each of which includes a predetermined number of pixels, among 40 line pixels of the Non-TTL AF sensor. For example, three areas can be provided as the plurality of areas by setting one group from every 12 pixels among 40 pixels.

According to the situation, 40 pixels may be divided into two areas, one of which is constituted by 16 pixels, and the other of which is constituted by 20 pixels. This division method will be described below in detail. The CPU 110, which performs step S504, corresponds to a pixel selection unit in the present invention, which is configured to select at least two pixel areas based on whether the result of contrast detection indicates high reliability or low reliability.

In step S505, the CPU 110 calculates a correlation based on a phase difference in each area with use of a signal within the pixel area of each of the divided areas, and calculates a focus detection result in each of the divided areas. The CPU 110, which performs step S505, corresponds to a second focus detection unit in the present invention.

In step S506, the CPU 110 confirms whether the focus detection result in each subarea corresponds to the contrast AF evaluation value acquired in step S503, and recalculates and determines the focus detection result. Then, the processing is ended.

Figure 7A:
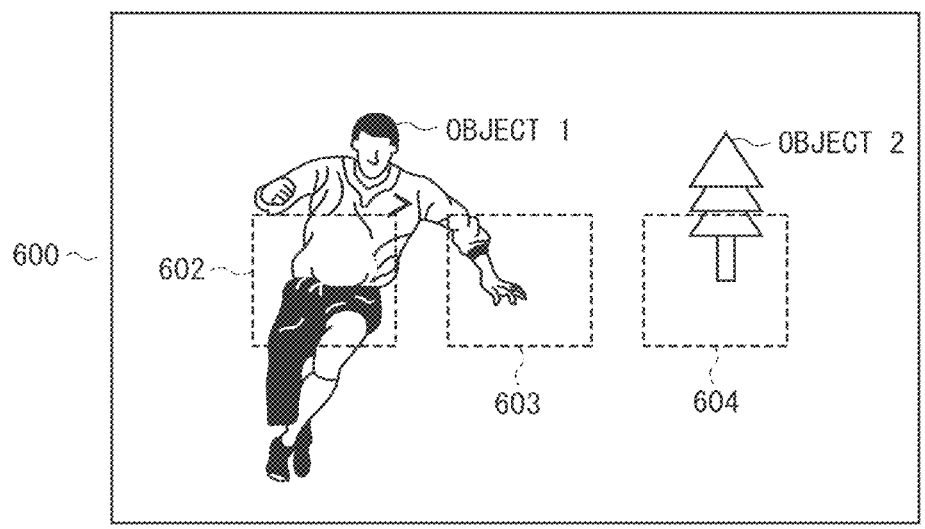
FIGS. 7A to 7D illustrate the first exemplary embodiment.

A specific example of this processing will be further described with reference to FIGS. 7A to 7D. FIG. 7A illustrates a state where an object 1 is positioned near the video camera, and an object 2 is positioned slightly away from the video camera in the object frame 600 of the main imaging system. The field of the Non-TTL AF sensor at this time is set in the area illustrated in FIGS. 6A and 6B. Similarly, the contrast AF frames are set as the frames 602 to 604 illustrated in FIG. 7A.

Figure 7B:
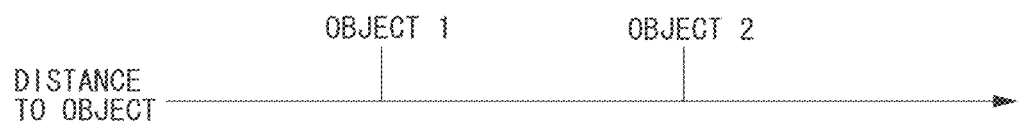
Figure 7C:
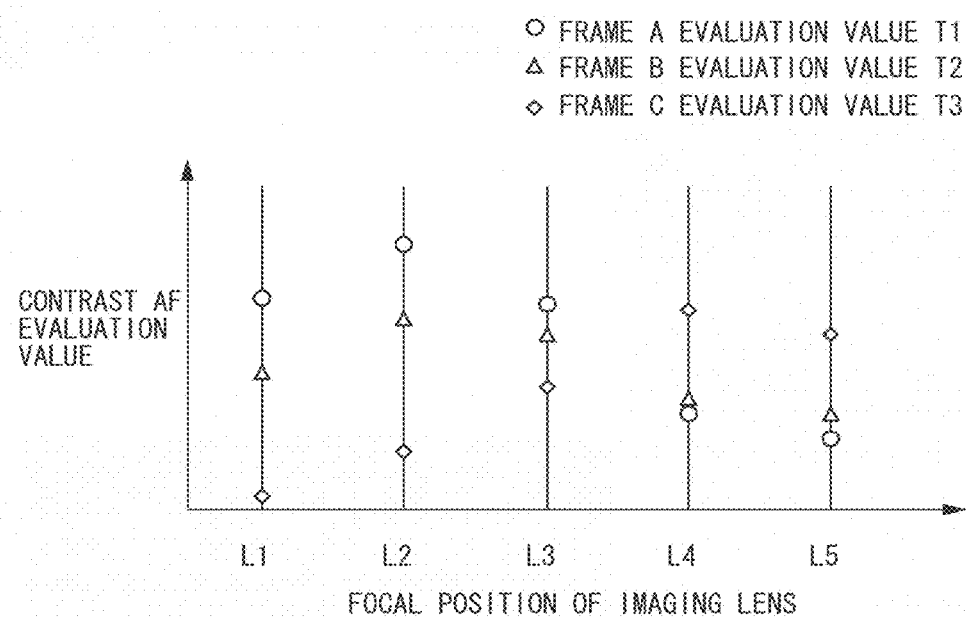

FIG. 7B illustrates the distances to the objects, and illustrates that the object 1 is positioned at a short distance side L2 and the object 2 is positioned at a long distance side L4. Further, FIG. 7C illustrates contrast AF evaluation values when the focal point of the imaging optical system at the object side is set to the respective positions L1 to L5, on the horizontal axis.

For example, when the focal point of the imaging optical system is located at the distance L2, the object 1 is in focus, and the contrast AF evaluation value T1 in the frame A 602 is extremely high. The contrast AF evaluation value T2 in the frame B 603 is a slightly high value, since a part of the arm is contained the frame B 603.

On the other hand, the contrast AF evaluation value T3 in the frame C 604 is a low value, since this frame captures the object 2, and a different distance contributes to an increase in a defocused amount accordingly. In this way, there is a group having a low contrast AF evaluation value and another group having a high contrast AF evaluation value, whereby a plurality of subareas are set to the Non-TTL AF sensor based on these values.

Figure 7D:
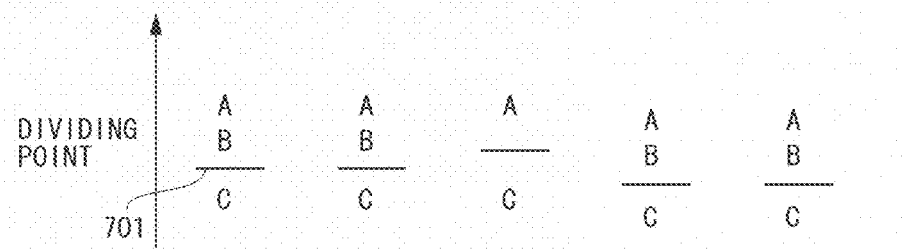

FIG. 7D illustrates where a boundary is drawn to define subareas by a line 701 as a dividing point. Referring to the section corresponding to the distance L2, the line 701 is used as a dividing point that defines the frame A and the frame B as one subarea, and the frame C as the second subarea. At this time, a plurality of areas of the Non-TTL AF sensor is set by defining subareas as illustrated in FIG. 8.

FIG. 8 illustrates a field 801 of the image A of the Non-TTL AF sensor, indicating which pixels correspond to the respective frames A to C as the set contrast AF frames. Since the frame A and the frame B are determined to belong to a same subarea, a subarea 1 is set to include pixels from the pixel SA1, which is a pixel at the frame A side in the Non-TTL AF sensor area, to the pixel SA22, which is a pixel positioned slightly inward toward the frame A from the last pixel in the frame B. Further, a subarea 2 is set to include 14 pixels from the pixel SA27 to the pixel SA40, which correspond to the frame C.

The example illustrated in FIGS. 7A to 7D has been described as to how subareas are set when the imaging lens is focused on the distance L2. Even when the imaging lens is focused on another distance, subareas can be set in a substantially similar manner based on the contrast AF evaluation values. However, for example, when the imaging lens is focused on the distance L3, none of the contrast AF evaluation values may have a large value.

In this case, one possible method is to generate a subarea corresponding to each area, instead of generating two subareas. However, the present exemplary embodiment does not employ this method, and instead, two subareas are set to correspond to the frame A and the frame C. In other words, if this method is explained with reference to FIG. 8, for example, a subarea 1 is set to include pixels from SA1 to SA15, and a subarea 2 is set to include pixels from SA26 to SA40.

The correlation calculation result with use of all of the pixels SA1 to SA40 is not reliable as a focus detection result of the Non-TTL AF sensor or lacks sufficient focus detection accuracy, since there are objects positioned away from the video camera by a plurality of different distances.

On the other hand, calculating a correlation with use of only pixels in each of the subareas 1 and 2 results in realization of focus detection that can provide a highly reliable and accurate focus detection result, since there is only an object positioned in a single distance from the video camera in each frame.

In this way, specifying a portion determined to blur among the contrast AF frames while associating it with the field of the Non-TTL AF sensor enables focus detection of the blurring portion in contrast AF, thereby enabling this technique to be used for various purposes as an AF application.

A second exemplary embodiment of the present invention will be described. A difference from the first exemplary embodiment is a process to generate subareas of the Non-TTL AF sensor. Accordingly, only the method for generating subareas according to the second exemplary embodiment will be described in detail below with reference to FIGS. 9A and 9B.

In the first exemplary embodiment, the subareas are defined according to the contrast AF evaluation values. On the other hand, in the second exemplary embodiment, the subareas are defined based on a face detection frame. In recent years, the face detection function has been provided to cameras as a standard feature. There are various methods therefor, and the present exemplary embodiment will be described based on an example in which the CPU 110 detects a face detection frame based on an imaging signal.

Figure 9A:
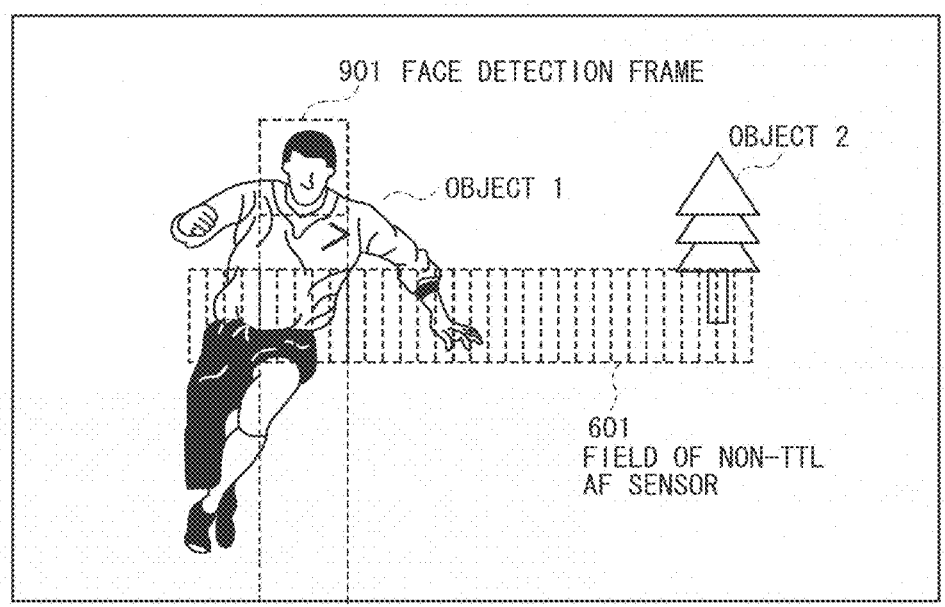
FIGS. 9A and 9B illustrate subarea selection according to a second exemplary embodiment.
Figure 9B:
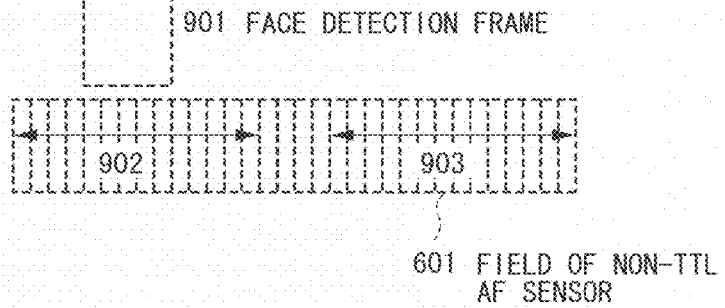

The thus-detected face detection frame is changed according to the size of an imaged human face. For example, referring to FIGS. 9A and 9B, since the object 1 is a human, a frame 901 is acquired as a face detection frame. FIGS. 9A and 9B also illustrate the field 601 of the Non-TTL AF sensor. At this time, the size of a subarea 1 is determined as a size corresponding to the face detection frame 901 magnified at a predetermined magnification greater than 1 (for example, an integer) with the face detection frame 901 positioned at the center thereof. In the example illustrated in FIGS. 9A and 9B, an area 902 (SA1 to SA20) is determined as the subarea 1 for the Non-TTL AF sensor.

Further, as another area, an area 903 is determined as a subarea 2. A correlation is calculated from signals from the respective subareas 1 and 2, and is returned as a focus detection result.

It should be noted that the present exemplary embodiment is not limited to detection of a human face by the face detection frame. The CPU 110 may detect a predetermined target of an object. In this case, the CPU 110 corresponds to a target detection unit in the present invention.

In this way, when a focus detection result of the Non-TTL AF sensor is not highly reliable, pixel areas required for correlation calculation, among all pixels of the Non-TTL AF sensor, are set as subareas according to the contrast AF evaluation values or the result of the face detection frame, and a correlation is recalculated based on the subareas. As a result, it is possible to divide an object positioned near the camera and an object positioned away from the camera, thereby improving the reliability and accuracy of a focus detection result of the Non-TTL AF sensor to allow this technique to be used for various AF applications.

Further, even when the above-described line sensor is replaced with a pair of area sensors provided to a plurality of pixels in the image sensor 109, i.e., even in the so-called imaging plane phase difference AF system, focus detection can be performed according to a generally similar processing flow.

Figure 10:
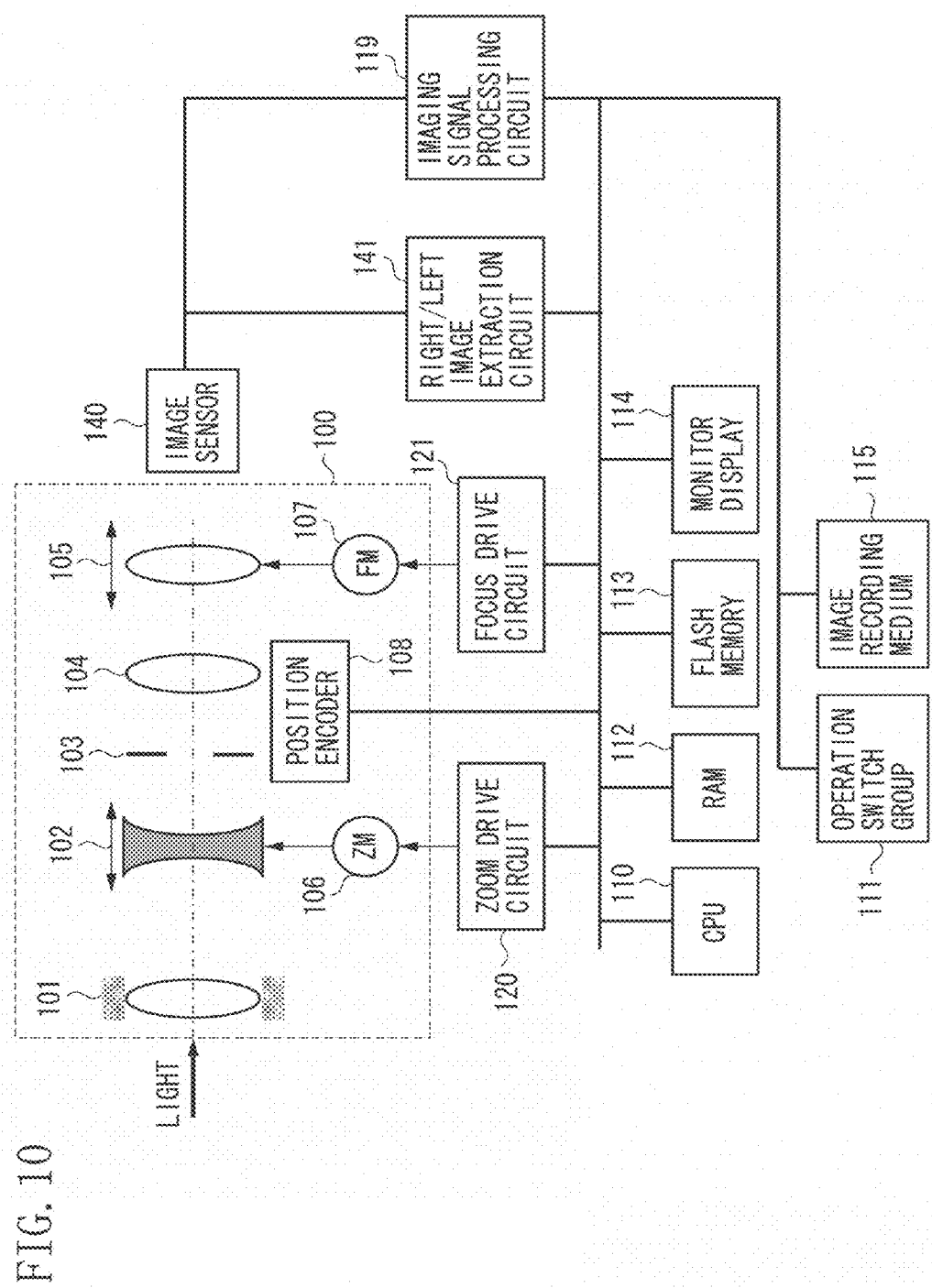
FIG. 10 illustrates a configuration of a video camera according to a third exemplary embodiment.

A third exemplary embodiment will be described below. FIG. 10 illustrates a configuration of a video camera provided with a focus detection apparatus according to the third exemplary embodiment of the present invention. Differences from the configuration of the first exemplary embodiment illustrated in FIG. 1 are that the image sensor 109 is replaced with an image sensor 140 having a different internal configuration, a right/left image extraction circuit 141 is additionally provided, and the Non-TTL sensor 130 is removed.

The image sensor 140 according to the third exemplary embodiment has an optical system and sensor arrangement configured to allow acquisition of a right image and a left image within the image sensor 140. For example, a plurality of photoelectrical conversion areas is provided below a micro lens to allow acquisition of a signal for an image A and a signal for an image B, thereby allowing calculation of a phase difference between the image A and the image B constituted by sets of the signals.

Outputs of the sensor are extracted as image A data and image B data by the right/left image extraction circuit 141, respectively, and are stored in predetermined positions in the RAM 112. The present exemplary embodiment is configured in such a manner that CPU 110 calculates a correlation based on the stored image A data and image B data, and detects a focusing state from the phase difference.

Further, as is the case with the first exemplary embodiment, the present exemplary embodiment can also generate a contrast AF evaluation value in a set predetermined frame by the imaging signal processing circuit 119. Now, AF control performed by the CPU 110 will be described.

Figure 11:
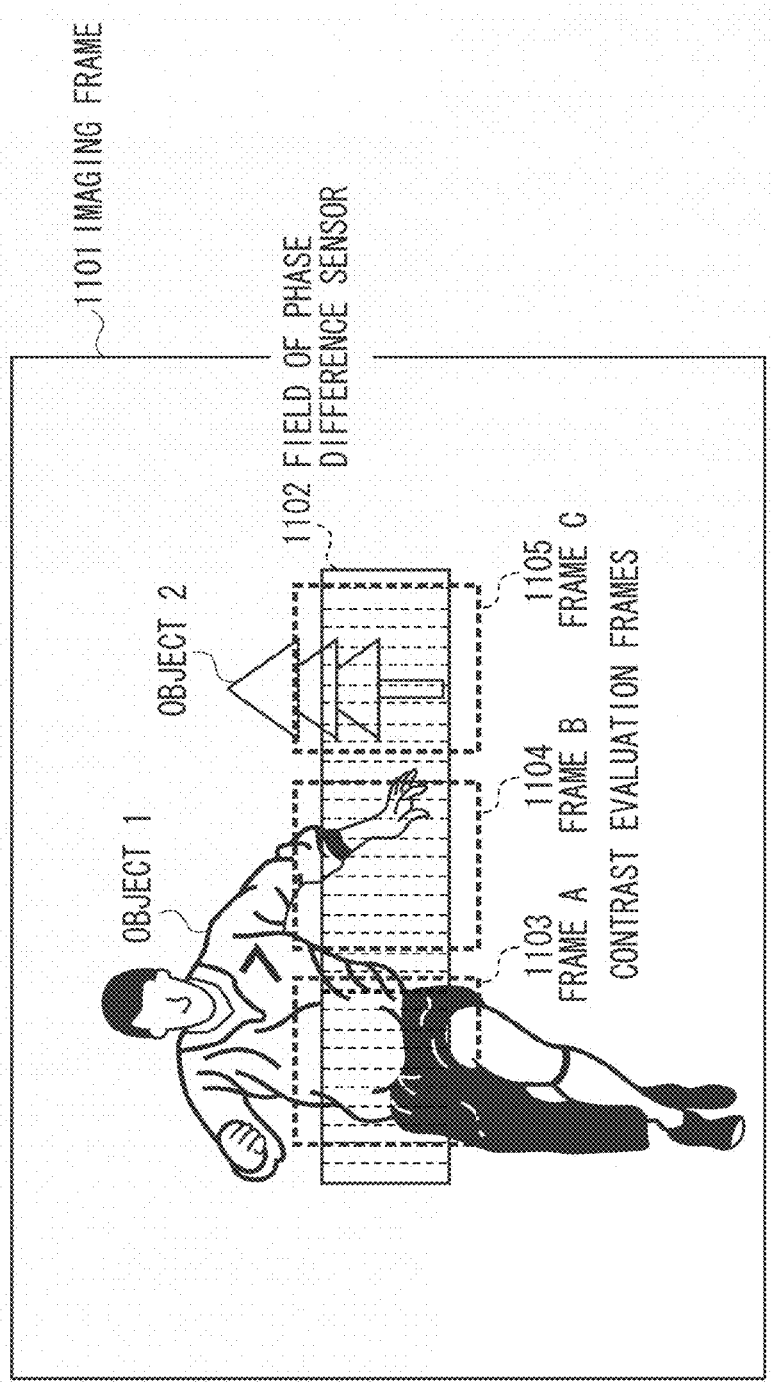
FIG. 11 illustrates respective areas according to the third exemplary embodiment.

FIG. 11 illustrates a phase difference frame and contrast evaluation frames (TVAF frames), for generating the contrast AF evaluation value, with respect to the imaging angle of view when the video camera is started up. FIG. 11 also illustrates objects while indicating where the frames are situated relative to the objects at a certain moment.

More specifically, a frame 1101 indicates the whole imaging angle of view, and a single phase difference frame 1102 is set at the central area of the angle of view in the frame 1101. Further, frames 1103 to 1105 are set as contrast evaluation frames in such a manner that the contrast evaluation frames 1103 to 1105 divide the phase difference frame 1102 into three areas while being superimposed on the phase difference frame 1102. The contrast evaluation frames 1103 to 1105 are referred to as a frame A, a frame B, and a frame C, respectively.

Figure 12:
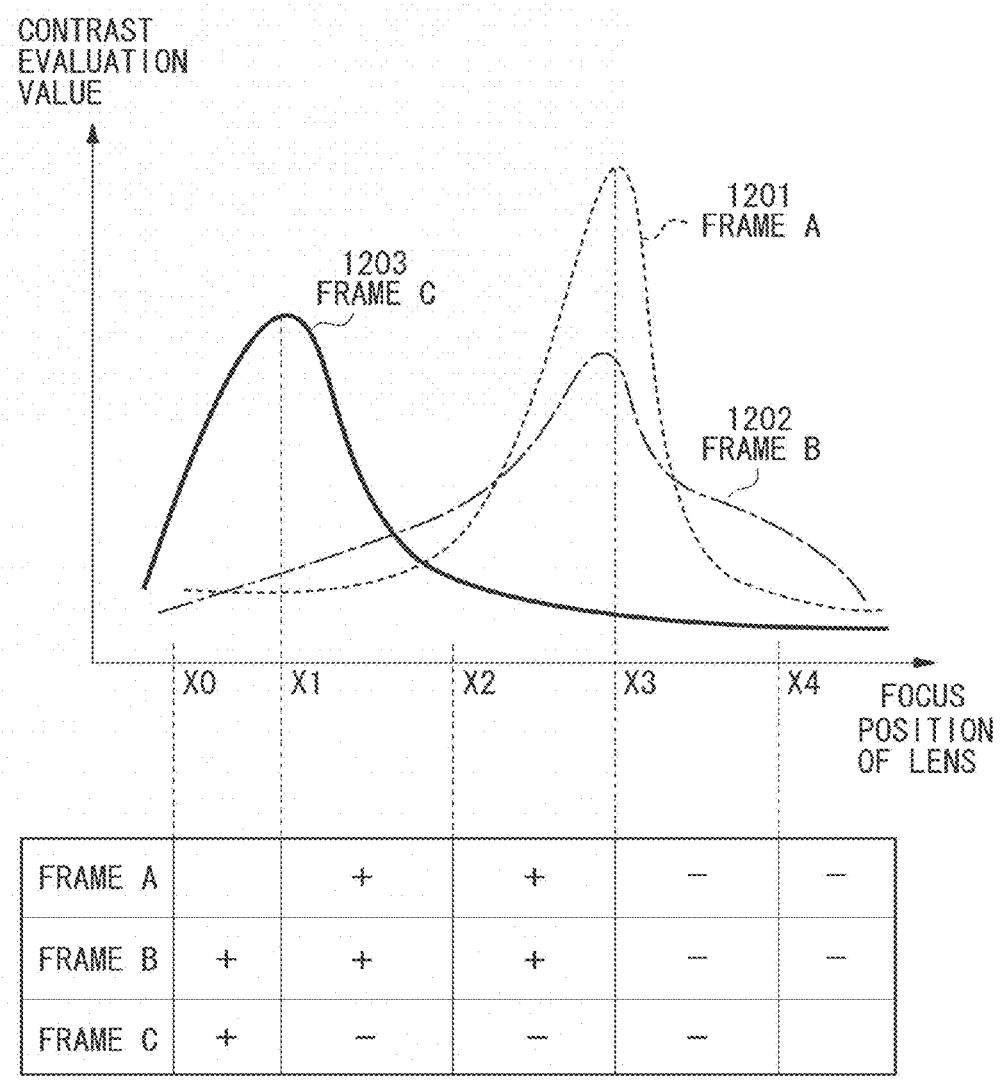
FIG. 12 illustrates changes in evaluation values according to the third exemplary embodiment.

The object 1 is positioned slightly near the camera (distance X3), and the object 2 is positioned slightly away from the camera (distance X2). FIG. 12 illustrates how the contrast evaluation values are changed when the position of the focus lens 105 is driven from the infinite distance end to the closest distance end while the objects are in this positional relationship.

In the graph in FIG. 12, the horizontal axis represents the position of the focus lens 105, and X0 corresponds to the infinite distance side while X4 corresponds to the closest distance side. Further, the vertical axis represents the contrast evaluation values. Lines 1201, 1202, and 1203 indicate changes in the contrast evaluation values in the respective frames A, B, and C with respect to the position of the lens 105.

Further, the table in FIG. 12 indicates extracted signs of change amounts of the contrast evaluation values, assuming that the position of the focus lens 105 is moving toward the closest distance end. For example, when the position of the lens moves from X0 to X1, the cell corresponding to the frame A remains blank indicating that detection is impossible due to the unchanged contrast evaluation value in the frame A at this time. On the other hand, the signs in the cells corresponding to the frames B and C indicate a positive change and an increase in the contrast evaluation values in the frames B and C.

Further, when the position of the focus lens 105 moves from X1 to X2, the contrast evaluation values in the frames A and B are increased, and therefore plus signs are written in the corresponding cells. On the other hand, a minus sign, which indicates a reduction, is written in the cell corresponding to the frame C.

Assuming that the objects and the frames are in such a relationship, and the initial value of the focus lens position at time t0 is positioned at x0, an AF control operation will be described below with reference to the flowchart of FIG. 13.

Figure 13:
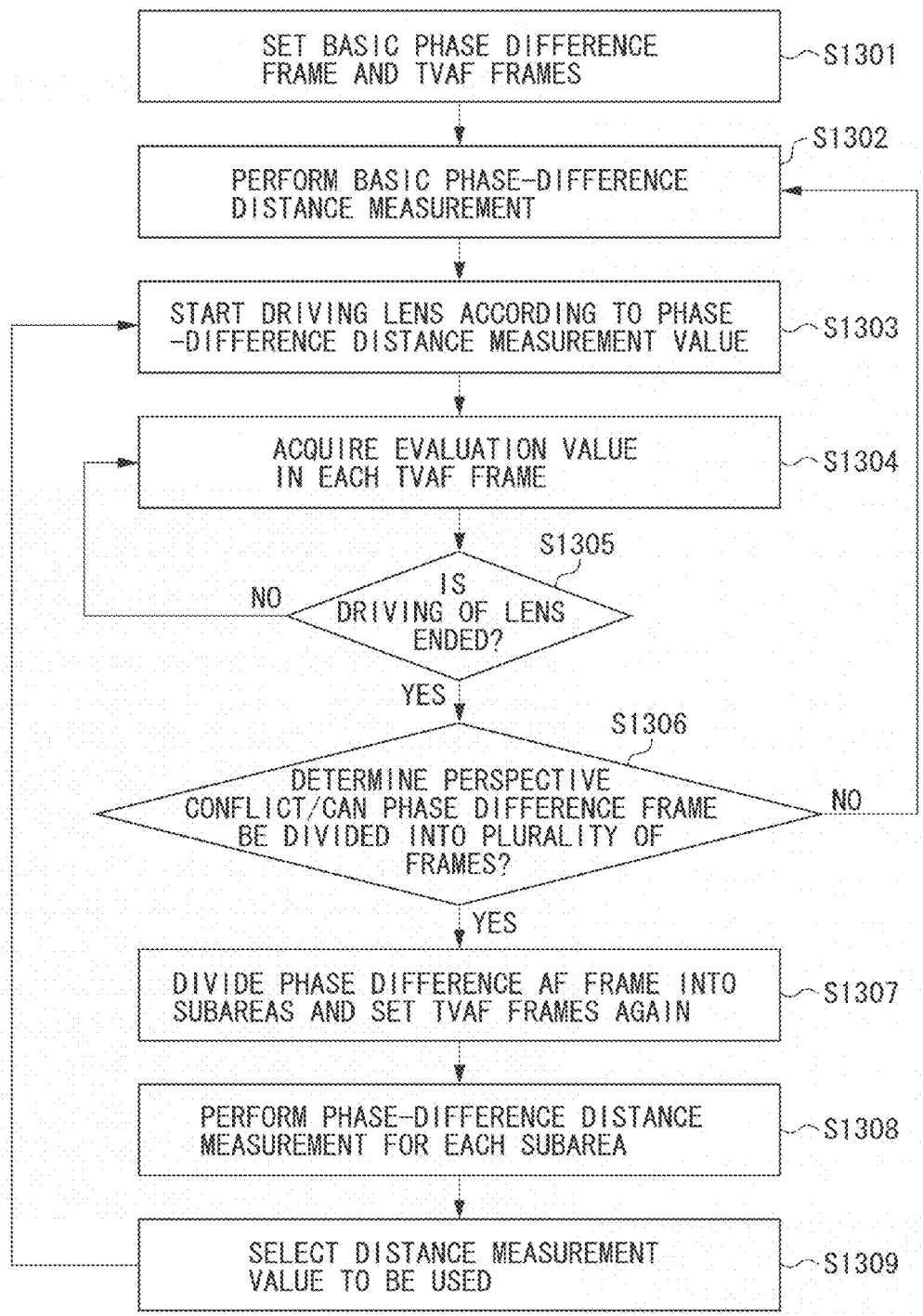
FIG. 13 is a flowchart illustrating a focusing operation according to the third exemplary embodiment.

In step S1301 illustrated in FIG. 13, the CPU 110 sets the phase difference frame and the TVAF frames as illustrated in FIG. 11 as default values immediately after a startup of the video camera. In step S1302, the CPU 110 calculates a correlation with respect to the phase difference frame, and calculates a focus lens target position from the image shift amount.

When the objects are in the positional relationship as illustrated in FIG. 11, a perspective conflict occurs. In this example, the object distance corresponding to the focus lens target position is set to the position corresponding to the focus lens position X2, which is a middle point between the distance to the object 1 and the distance to the object 2. In step S1303, the focus lens 105 starts to be driven toward the calculated focus lens target position X2.

In step S1304, the CPU 110 acquires the contrast evaluation values corresponding to the respective frames A, B, and C as the set TVAF frames. Due to the control in step S1305, the CPU 110 keeps acquiring the contrast evaluation values corresponding to the respective frames A, B, and C until driving of the focus lens 105 is ended.

In step S1305, if it is determined that driving of the focus lens 105 is ended (YES in step S1305), in step S1306, the CPU 110 determines whether the phase difference frame should be divided based on the changes in the contrast evaluation values corresponding to the respective TVAF frames. This determination corresponds to evaluation about a possibility of a perspective conflict.

Figure 14:
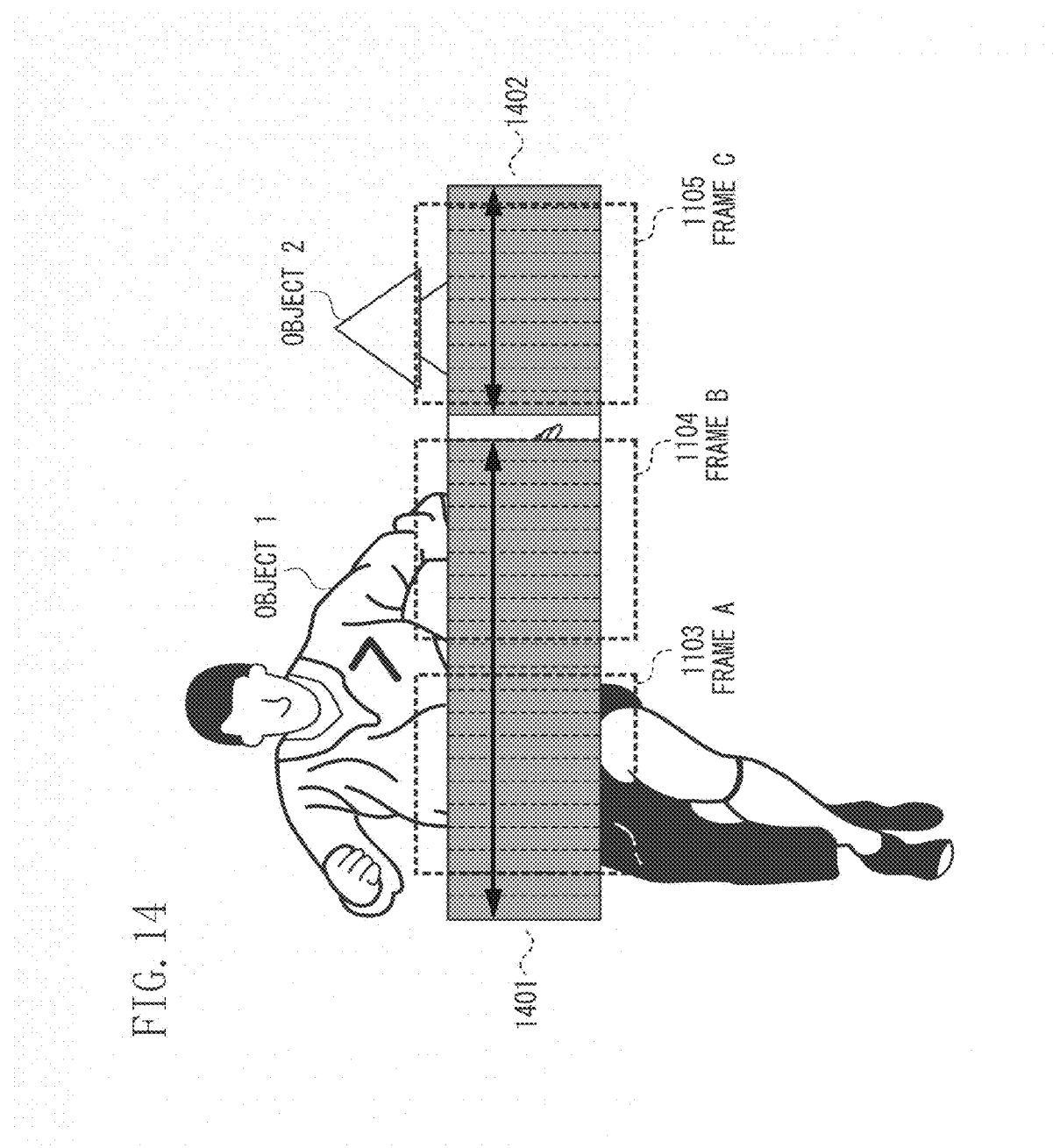
FIG. 14 illustrates the third exemplary embodiment.

A perspective conflict occurs in the example illustrated in FIG. 11, and therefore the CPU 110 determines that the frames A, B, and C are divided into two areas, an area constituted by the frames A and B, and an area constituted by the frame C, based on changes in the signs in the table illustrated in FIG. 12 (YES in step S1306). Accordingly, in step S1307, the phase difference frame is set again as illustrated in FIG. 14.

The CPU 110 divides the phase difference frame 1102 illustrated in FIG. 11 into two phase difference frames 1401 and 1402, and sets them as a phase difference subarea 1 and a phase difference subarea 2, respectively. In addition to dividing the phase difference frame in this manner, the CPU 110 further sets TVAF frames to the respective divided phase difference frames in such a manner that the TVAF frames are superimposed on the phase difference frames.

Figure 15:
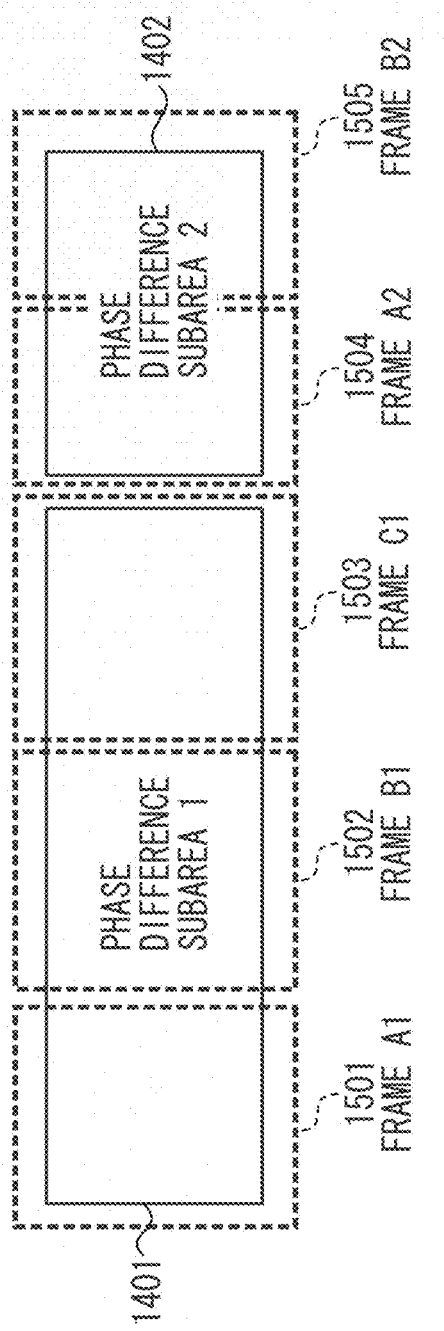
FIG. 15 illustrates the third exemplary embodiment.

FIG. 15 illustrates how these frames are set. In an example illustrated in FIG. 15, three TVAF frames, namely, a frame A1, a frame B1, and a frame C1 are set to the phase difference subarea 1 1401, and two TVAF frames, namely, a frame A2 and a frame B2 are set to the phase difference subarea 2 1402.

The number of TVAF frames reset to a subarea may be changed according to the size of the phase difference AF frame. Any number of subareas may be set, but it is effective to set at least two subareas. After setting the frames in this manner, in step S1308, the CPU 110 calculates a phase difference by correlation calculation and acquires a contrast evaluation value used for TVAF, for each of the set frames.

In step S1309, the CPU 110 determines which frame should be selected to use the corresponding phase difference to control lens drive from two calculated values of the phase differences.

Various methods can be employed for selecting a parameter to control lens drive from a plurality of correlation calculation results. In the present exemplary embodiment, priority is given to the closest distance and the center area. The processing proceeds to step S1303 again, in which the CPU 110 controls driving the lens using the selected parameter.

Now, this example will be described along a time axis with reference to FIG. 16. Assuming that the objects 1 and 2 are in the positional relationship illustrated in FIG. 11 of the present exemplary embodiment, FIG. 16 illustrates the position of the focus lens 105 with the initial value thereof set to X0, the state of the phase difference frame, a distance measurement value acquired from the phase difference, the states of the TVAF frames, and changes in the TVAF evaluation values, over time.

The table indicates that, at time t0, the focus lens 105 is located at the initial position X0, and the phase difference frame is also a basic frame initially set as a default frame. The result of the correlation calculation indicates a value corresponding to X2 in terms of the position of the focus lens 105.

Further, the table indicates that the contrast evaluation frames are three frames, namely, the frames A, B, and C, and the change amounts of the respective evaluation values are not calculated at this time. At time t1, the lens starts to be driven based on the phase difference result calculated from the signal acquired at time t0. At this time, the position of the lens is located at the position X1 closer to the camera than X0. No change occurs in the result of correlation calculation with use of the phase difference frame, which still indicates a value corresponding to X2.

Further, the table indicates that driving of the lens allows the evaluation values of the change amounts of the contrast evaluation values to be calculated, as a result of which "+" is set for the frames A and B (contrast increase) and "+" is also set for the frame C (contrast increase). At time t2, the position of the focus lens 105 reaches X2. The evaluation values of the change amounts of the contrast evaluation values are also calculated at this time, and the table indicates that "+" is set for the frames A and B (contrast increase) while the sign for the frame C is changed to "−" (contrast reduction).

The correlation calculation with use of the basic phase difference frame still results in detection of the value corresponding to X2, so that the focus lens 105 is not driven.

However, the results of the contrast changes in the frames A, B, and C as the TVAF frames during driving of the focus lens 105 from X0 to X2 until now reveals that the frames A and B show a similar change trend, while the frame C shows such a change trend that the contrast evaluation value is first increased and then takes a downward turn. This means that it is highly likely that the objects in the frames A and B are different from the object in the frame C.

According to this detection result, as described above in step S1306, the phase difference frame is divided from one basic frame into two subareas. Further, as described above, contrast evaluation frames are also set to the respective subareas. More specifically, the frame A1, the frame B1, and the frame C1 are set to the subarea 1, and the frame A2 and the frame B2 are set to the subarea 2.

In the thus-set state, at time t3, two phase difference frames are set as the subareas 1 and 2. As a result of correlation calculation for each frame, a correlation calculation result corresponding to X3 is acquired for the subarea 1, and a correlation calculation result corresponding to X1 is acquired for the subarea 2.

X3 is selected from these two correlation calculation results based on the method for calculation with the priority given to the closest distance and the central area in the angle of view. As a result, the position of the focus lens 105 is driven to position X3. Therefore, after a predetermined time has passed (not illustrated), the focus lens 105 is moved to the position corresponding to X3, and is focused on the object 1.

Figure 17:
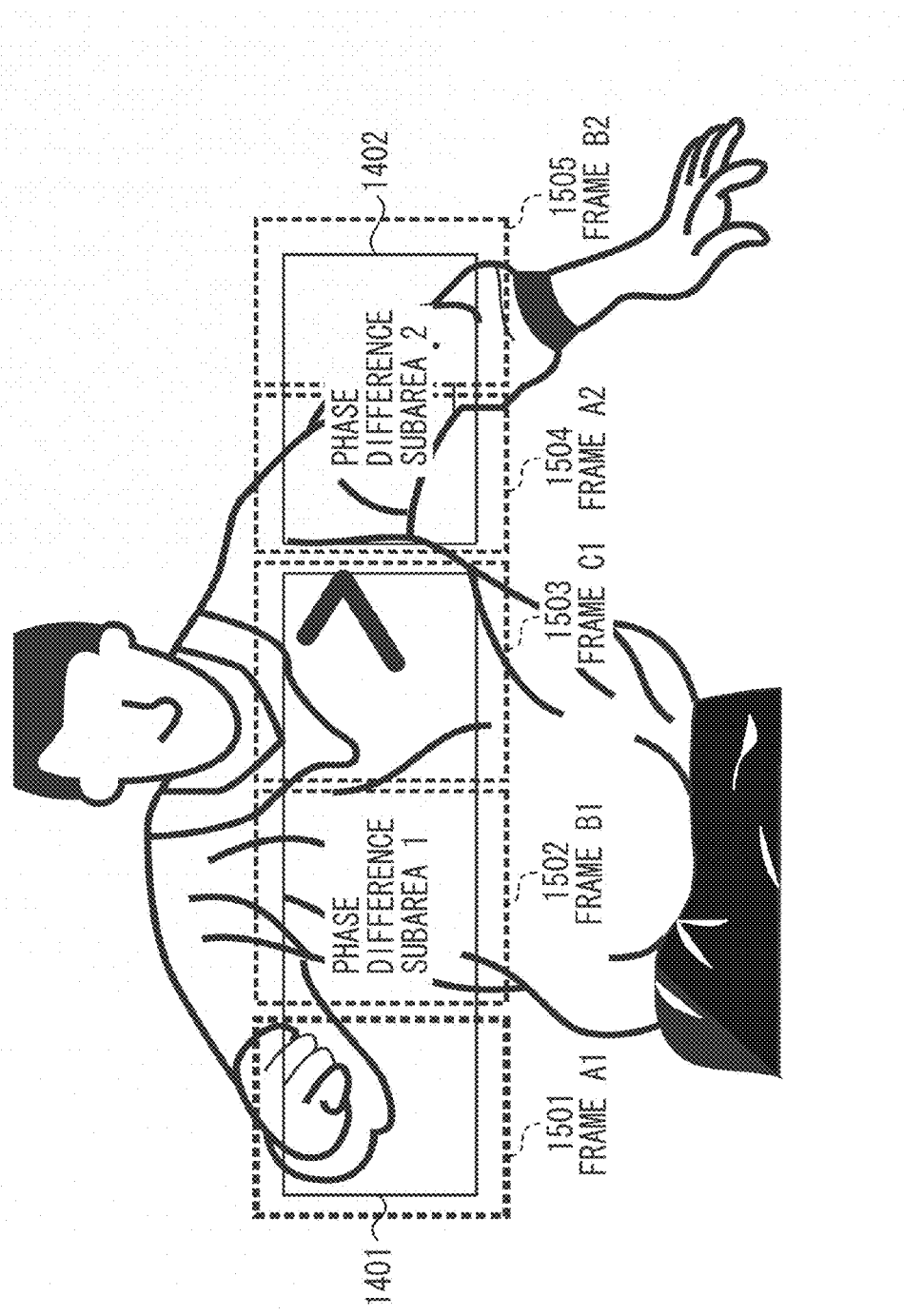
FIG. 17 illustrates the third exemplary embodiment.

Next, an operation after the above-described division of the phase difference frame will be described with reference to FIGS. 17 and 18. FIG. 17 illustrates a relationship between the object 1 and the detection frames when the object 1 (or the camera) moves transversely so that the whole range of the phase difference frame is occupied by the object 1.

FIG. 18 is a table indicating how the focus lens position, the contrast evaluation values, and the phase-difference distance measurement value are changed in this state. At time t5, the position of the focus lens 105 is positioned at X3, maintaining the in-focus state. At this time, X3 is detected as both the distance measurement results for the phase difference subareas 1 and 2.

Since the distance measurement values are the same for the phase difference frame subareas 1 and 2, in the subsequent step, the two subareas are combined to be returned to the initial basic frame in this case. Therefore, at the subsequent time, time t6, the phase difference frame is returned to the basic frame, and X3 is detected as the result of the distance measurement thereof. Further, the table indicates that the contrast evaluation frames are also returned to the settings corresponding to the basic phase difference frame, and are set as the frames A, B, and C which are initial frame settings.

The above-described operation is repeated, and the frames are set according to changes in the contrast evaluation values while using the result of phase-difference distance measurement. As a result, it is possible to guide even an object having a perspective conflict to an in-focus state.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-138705 filed Jun. 22, 2011 and No. 2012-090367 filed Apr. 11, 2012, which is hereby incorporated by reference herein in their entirety.

What is claimed is:

1. A focus detection apparatus comprising:
an image sensor configured to photoelectrically convert an image of an object in an imaging area, the image being formed by light transmitted through an imaging optical system;
a phase difference detection unit configured to detect a focusing state from a phase difference between two images of the object;
a pixel selection unit configured to set an area in which the phase difference is detected by the phase difference detection unit; and
a contrast detection unit configured to detect contrast in a set object frame based on a signal output from the image sensor,
wherein the pixel selection unit sets the area based on a detection result of the contrast detection unit, in a case where it is determined that reliability of the focusing state detected by the phase difference detection unit is low.

2. The focus detection apparatus according to claim 1, wherein a size of the set object frame is changed according to a focal length of the imaging optical system.

3. The focus detection apparatus according to claim 1, wherein the pixel selection unit sets at least two areas based on whether the contrast detection result of the contrast detection unit is high or low.

4. A focus detection apparatus comprising:
an image sensor configured to photoelectrically convert an image of an object in an imaging area, the image being formed by light transmitted through an imaging optical system;
a phase difference detection unit configured to detect a focusing state from a phase difference between two images of the object;
a pixel selection unit configured to set an area in which the phase difference is detected by the phase difference detection unit; and
a target detection unit configured to detect a predetermined target of the object based on a signal output from the image sensor,
wherein the pixel selection unit sets the area based on a detection result of the target detection unit, in a case where it is determined that reliability of the focusing state detected by the phase difference detection unit is low.

5. The focus detection apparatus according to claim 4, wherein the target detection unit detects a face as the predetermined target of the object.

6. The focus detection apparatus according to claim 4, wherein the target detection unit changes a size of the predetermined target of the object according to a focal length of the imaging optical system.

7. The focus detection apparatus according to claim 4, wherein the pixel selection unit sets a size of the selected pixel area to a size corresponding to the predetermined target of the object magnified at a predetermined magnification greater than 1.

8. The focus detection apparatus according to claim 1, wherein a sensor of the phase difference detection unit is a line sensor configured to receive light from a different optical system from the imaging optical system.

9. The focus detection apparatus according to claim 1, wherein a sensor of the phase difference detection unit is a sensor provided to a plurality of pixels in the image sensor.

10. The focus detection apparatus according to claim 1, wherein a perspective conflict is identified in the set object frame and the set object frame is divided into a plurality of frames.

11. The focus detection apparatus according to claim 1, wherein:
   a plurality of the object frames are set;
   a value based on the detected contrasted is calculated for each of the object frames; and
   a subset of the plurality of object frames in which the value based on the detected contrast are substantially the same are combined into a single object frame.

* * * * *